United States Patent
Das

(10) Patent No.: US 9,009,477 B2
(45) Date of Patent: *Apr. 14, 2015

(54) ARCHIVING ELECTRONIC CONTENT HAVING DIGITAL SIGNATURES

(71) Applicant: Adobe Systems Incorporated, San Jose, CA (US)

(72) Inventor: Sujata Das, Saratoga, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/970,954

(22) Filed: Aug. 20, 2013

(65) Prior Publication Data

US 2014/0032927 A1   Jan. 30, 2014

Related U.S. Application Data

(63) Continuation of application No. 12/130,242, filed on May 30, 2008, now Pat. No. 8,621,222.

(51) Int. Cl.
*H04L 9/32* (2006.01)
*G06F 21/64* (2013.01)

(52) U.S. Cl.
CPC ............... *G06F 21/64* (2013.01); *H04L 9/321* (2013.01); *H04L 9/3247* (2013.01); *H04L 9/3268* (2013.01)

(58) Field of Classification Search
CPC ...... H04L 63/08; H04L 9/3294; H04L 9/3281
USPC .................................. 713/168, 175, 176, 178
See application file for complete search history.

(56) References Cited

U.S. PATENT DOCUMENTS

| | | |
|---|---|---|
| 6,145,079 A | 11/2000 | Mitty |
| 6,237,096 B1 | 5/2001 | Bisbee et al. |
| 6,253,323 B1 | 6/2001 | Cox et al. |
| 6,367,013 B1 | 4/2002 | Bisbee et al. |
| 6,763,459 B1 | 7/2004 | Corella |
| 7,373,520 B1 | 5/2008 | Borthakur et al. |
| 7,577,689 B1 | 8/2009 | Masinter et al. |
| 2001/0002485 A1* | 5/2001 | Bisbee et al. ............. 713/167 |
| 2003/0088771 A1 | 5/2003 | Merchen |
| 2005/0044478 A1 | 2/2005 | Ali et al. |
| 2006/0120354 A1 | 6/2006 | Sohn |
| 2006/0212400 A1* | 9/2006 | Kamperman et al. .......... 705/51 |
| 2009/0271318 A1 | 10/2009 | Grobler |
| 2010/0212017 A1 | 8/2010 | Li et al. |

OTHER PUBLICATIONS

U.S. Appl. No. 12/130,242, Appeal Brief filed Apr. 3, 2013, 20 pgs.
U.S. Appl. No. 12/130,242, Final Office Action mailed Jan. 7, 2013, 11 pgs.

(Continued)

*Primary Examiner* — Teshome Hailu
(74) *Attorney, Agent, or Firm* — Shook, Hardy & Bacon L.L.P.

(57) ABSTRACT

In various embodiments, a computerized method includes receiving electronic content to be archived. The electronic content comprises a digital signature. The method may include archiving the digital signature, by determining a validity status of the digital signature and storing the validity status in the electronic content. The method may also include archiving the electronic content after the validity status has been stored in the electronic content.

19 Claims, 7 Drawing Sheets

(56) References Cited

OTHER PUBLICATIONS

U.S. Appl. No. 12/130,242, Final Office Action mailed Aug. 31, 2011, 19 pgs.
U.S. Appl. No. 12/130,242, Non Final Office Action mailed Mar. 14, 2011, 13 phs.
U.S. Appl. No. 12/130,242, Non Final Office Action mailed Jun. 8, 2012, 11 pgs.
U.S. Appl. No. 12/130,242, Notice of Allowance mailed Jun. 11, 2013, 15 pgs.
U.S. Appl. No. 12/130,242, Response filed Jun. 13, 2011 to Non-Final Office Action mailed Mar. 14, 2011, 13 pgs.
U.S. Appl. No. 12/130,242, Response filed Nov. 21, 2011 to Final Office Action mailed Aug. 31, 2011, 12 pgs.
U.S. Appl. No. 12/130,242, Response filed Sep. 10, 2012 to Non Final Office Action mailed Jun. 8, 2012, 11 pgs.

* cited by examiner

ARCHIVING ELECTRONIC CONTENT HAVING DIGITAL SIGNATURES

This application is a continuation of U.S. patent application Ser. No. 12/130,242, filed on May 30, 2008, which is hereby incorporated by reference herein in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2008, Adobe® Systems Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Archiving of electronic content (documents, forms, etc.) allows for the long term preservation of such content.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
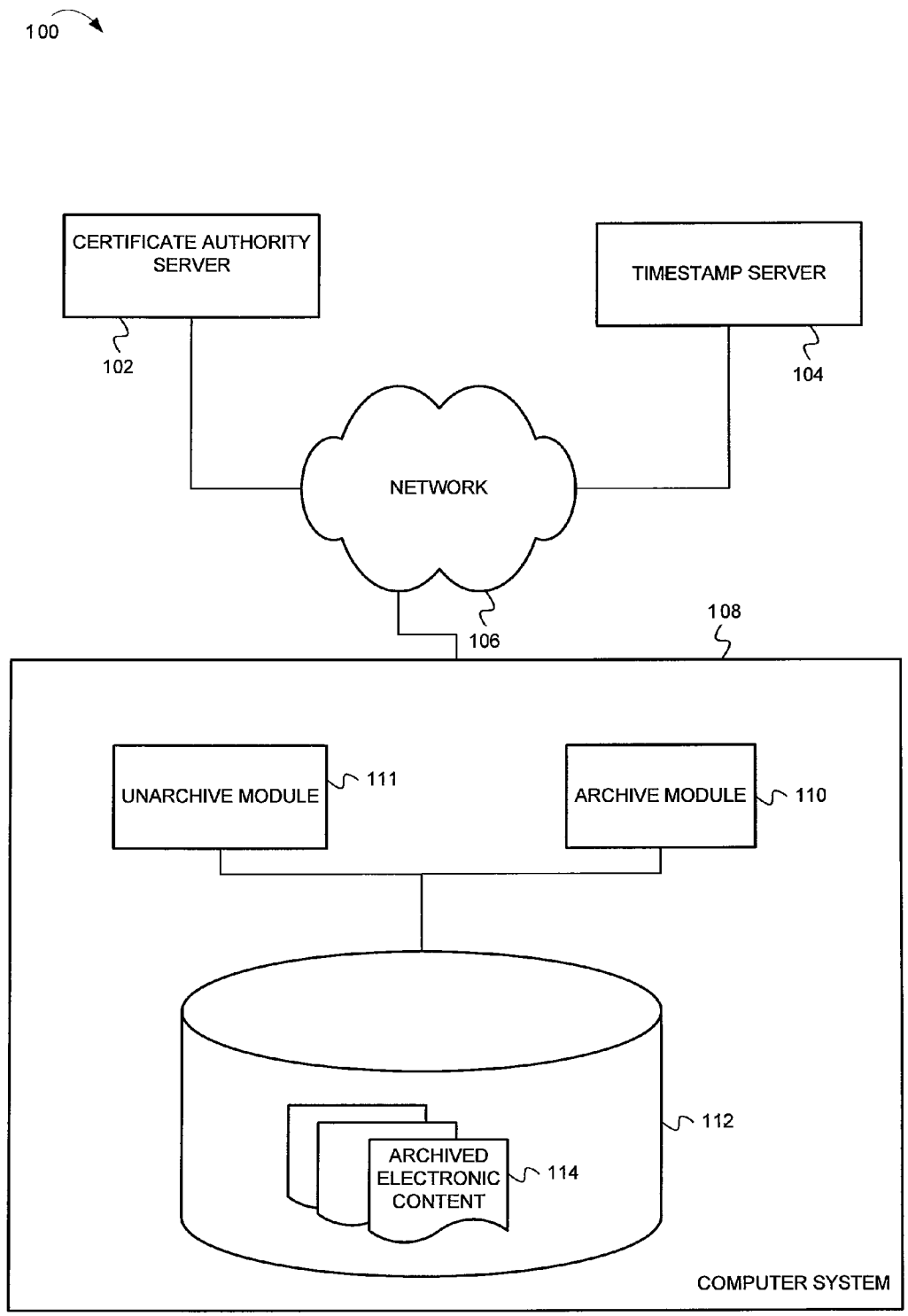
FIG. 1 is a system diagram for archiving electronic content having digital signatures, according to some example embodiments.

Methods, apparatus and systems for archiving of electronic content having digital signatures are described. In the following description, numerous specific details are set forth. However, it is understood that embodiments of the invention may be practiced without these specific details. In other instances, structures and techniques have not been shown in detail in order not to obscure the understanding of this description.

As used herein, the term "content" or "electronic content" may comprise any type of content for use in electronic form. Examples of content may comprise Portable Document Format ("PDF") which may be viewed and modified in one of the Adobe® Acrobat® programs, a web page, a word processing document (such as a Microsoft® Word document), a spread sheet document, page-descriptive electronic content, hypertext document, a markup language document, declarative specification document (such as for example a HyperText Markup Language HTML or eXtensible Markup Language (XML) document), a fillable form or data describing application graphical user interface, etc. In some example embodiments, the electronic content comprises a PDF document, wherein the PDF document is archived based on one of the PDF/Archive (PDF/A) standards. For example in some embodiments, the PDF document is archived based on the International Organization for Standardization (ISO) 19005-1:2005 "Document Management—Electronic Document File Format for Long-Term Preservation—Part 1: Use of PDF 1.4 (PDF/A-1)", published Oct. 1, 2005 and any versions thereof, which is hereby incorporated by reference.

As used herein, the term "digital signature" may be any type of electronic signature that may be used to authenticate the identity of a sender of a message or a signer of electronic content (e.g., an electronic document). In some example embodiments, the digital signature may ensure that the original content of the message or electronic content that has been sent is unchanged. Asymmetric cryptography may be used to create and verify a digital signature. In particular, a user's private encryption key is used to create the digital signature, and a user's public encryption key is used to verify the digital signature. The digital signature may be derived from any type hash operation of a given set of data. For example, the hash operations may include Message Digest (MD)2, MD4, MD5, Secure Hash Algorithm (SHA), etc. In some example embodiments, a digital signature is used to associate a particular user with a particular revision to electronic content. In some example embodiments, a Public Key Infrastructure (PKI) is used to bind public encryption keys with respective user identities by using a Certificate Authority (CA). A user identity may be considered unique for each CA. In some example embodiments, for a user, their identity, the public encryption key, the binding between the identity and the key, validity conditions and other attributes are made un-forgeable in public key certificates issued by a CA.

As used herein, the term "archive" may be any type of storage of electronic content for any period of time. In some example embodiments, as part of archiving, the profile of the electronic content is such that the content can be reproduced in the future after the content is unarchived. In some example embodiments, the archived electronic content is considered essentially self-contained so that the data needed to reproduce the document in essentially the same way is embedded within the content. For example, this embedded data may include raster images, vector graphics, fonts, color information, etc. In some example embodiments, as part of archiving, references to external sources are also removed prior to archiving the electronic content. For example, references to hyperlinks are removed.

Some example embodiments archive digitally signed electronic content while retaining data related to the validity of the digital signatures at the time of the archival therein. The electronic content may include a number of digital signatures of users that have revised the electronic content. In some example embodiments, validity of the number of digital signatures is checked prior to archiving the electronic content. Data regarding the validity of the electronic content may be stored within the electronic content prior to archiving of the electronic content. For example, this validity data may be stored in the metadata for the electronic content. Moreover, in some example embodiments, an attestation signature is generated across the archived electronic content (including the digital signatures and validity data regarding such signatures). The attestation signature and the archived electronic content can then be stored.

Accordingly, the digital signatures of users signing the electronic content are validated prior to archiving of the content. These example embodiments are in contrast to other approaches. In particular, one other approach captures an image of the electronic content and does not attempt to perform any type of validation. Another approach attempts to validate after the electronic content has been unarchived. However, if a digital signature remains as an active signature in the electronic content which is being archived, the digital signature may not validate correctly in the future after the content is unarchived. For example, the digital certificate used to create the digital signature might have expired or been revoked. Also, the CA that issued the digital certificate may not be in existence at the time the electronic content is unarchived. Moreover, updates to the electronic content subsequent to signing may affect the validity of the digital signature. For example, the archiving of electronic content alone might change the status of the digital signatures. In particular, archiving may include embedding of fonts used therein, removing references to device color spaces, removing disallowed constructs, such as Extensible Markup Language (XML) Forms Architecture (XFA) streams), etc.

Additionally, subsequent versions of an application used to open, edit, etc. the electronic content may invalidate an otherwise valid digital signature. Subsequent versions of an application might also change their functionality. If the electronic content includes changes after the content has been signed, the current version of the application might account for such changes and mark the signature as valid. In contrast, the subsequent versions of the application might not allow for such changes to the content and thus show the digital signature as invalid.

FIG. 1 is a system diagram for archiving electronic content having digital signatures, according to some example embodiments. A system 100 comprises a computer system 108, a certificate authority server 102 and a timestamp serve 104 that are couple together through a network 106.

The computer system 108 comprises an archive module 110, an unarchive module 111 and a machine-readable medium 112 that are coupled together. In some example embodiments, the machine-readable medium 112 includes tangible volatile and/or non-volatile media (e.g., read only memory (ROM), random access memory (RAM), magnetic disk storage media, optical storage media, flash memory devices, etc.). The machine-readable medium 112 may store archived electronic content 114 that was generated by the archive module 110. While the archive module 110, the unarchive module 111 and the machine-readable medium 112 are shown as being in a same computer system 108, embodiments are not so limited. The archive module 110, the unarchive module 111 and the machine-readable medium 112 that stores the archived electronic content 112 may be on separate systems. Furthermore, the archive module 110 may receive electronic content (from which archived electronic content 114 is generated) from the machine-readable medium 112 and/or a separate machine-readable medium. For example, the archive module 110 may receive the electronic content from a separate device coupled to the network 106. Similarly, the unarchive module 111 may receive archived electronic content 114 from the machine-readable medium 112 and/or a separate machine-readable medium. In some example embodiments, the unarchive module 111 is an application or part of an application used to display the unarchived electronic content for opening, reading, editing, etc. The archive module 110 and the unarchive module 111 may be software, hardware, firmware or a combination thereof for executing the various operations described herein, according to some example embodiments.

While the system 100 shown in FIG. 1 employs a client-server architecture, embodiments are not limited to such an architecture, and could equally well find application in a distributed, or peer-to-peer, architecture system. The network communication may occur as part of any combination of wired and wireless communication. In some embodiments, network communication may be based on one or more communication protocols (e.g., HyperText Transfer Protocol (HTTP), HTTP Secured (HTTPS), Real Time Messaging Protocol (RTMP), Real Time Messaging Protocol Secured/SSL (RTMPS), etc.).

Operations, according to some example embodiments, are now described. In certain embodiments, the operations are performed when instructions residing on machine-readable media (e.g., software) are executed, while in other embodiments, the methods are performed by hardware or other logic (e.g., digital logic).

Figure 2:
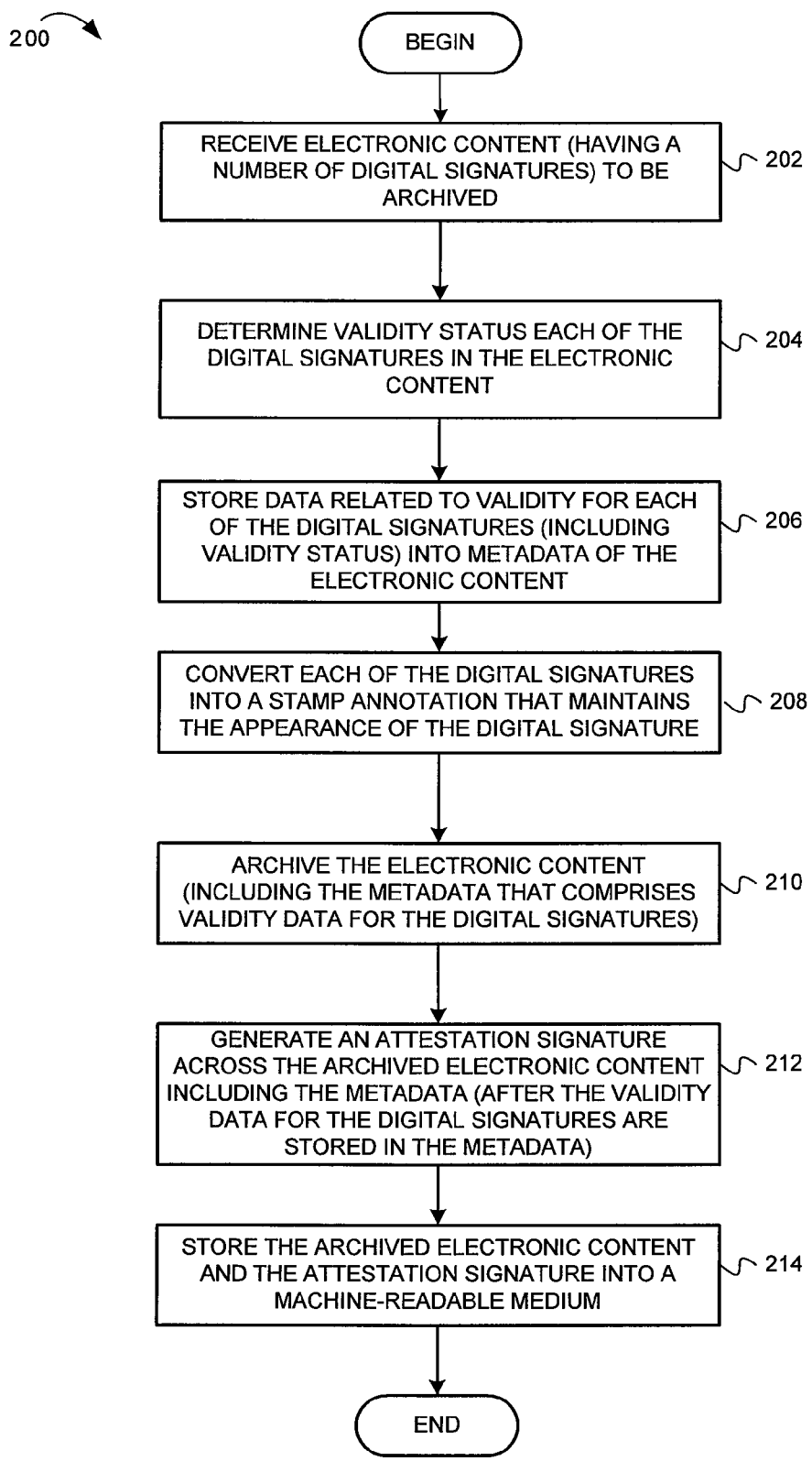
FIG. 2 is a diagram of a method for archiving electronic content having digital signatures, according to some example embodiments.

FIG. 2 is a diagram of a method for archiving electronic content having digital signatures, according to some example embodiments. A method 200 is described with reference to FIG. 1. In some example embodiments, the method 200 is performed by the archive module 110. The method 200 commences at block 202.

Figure 3:
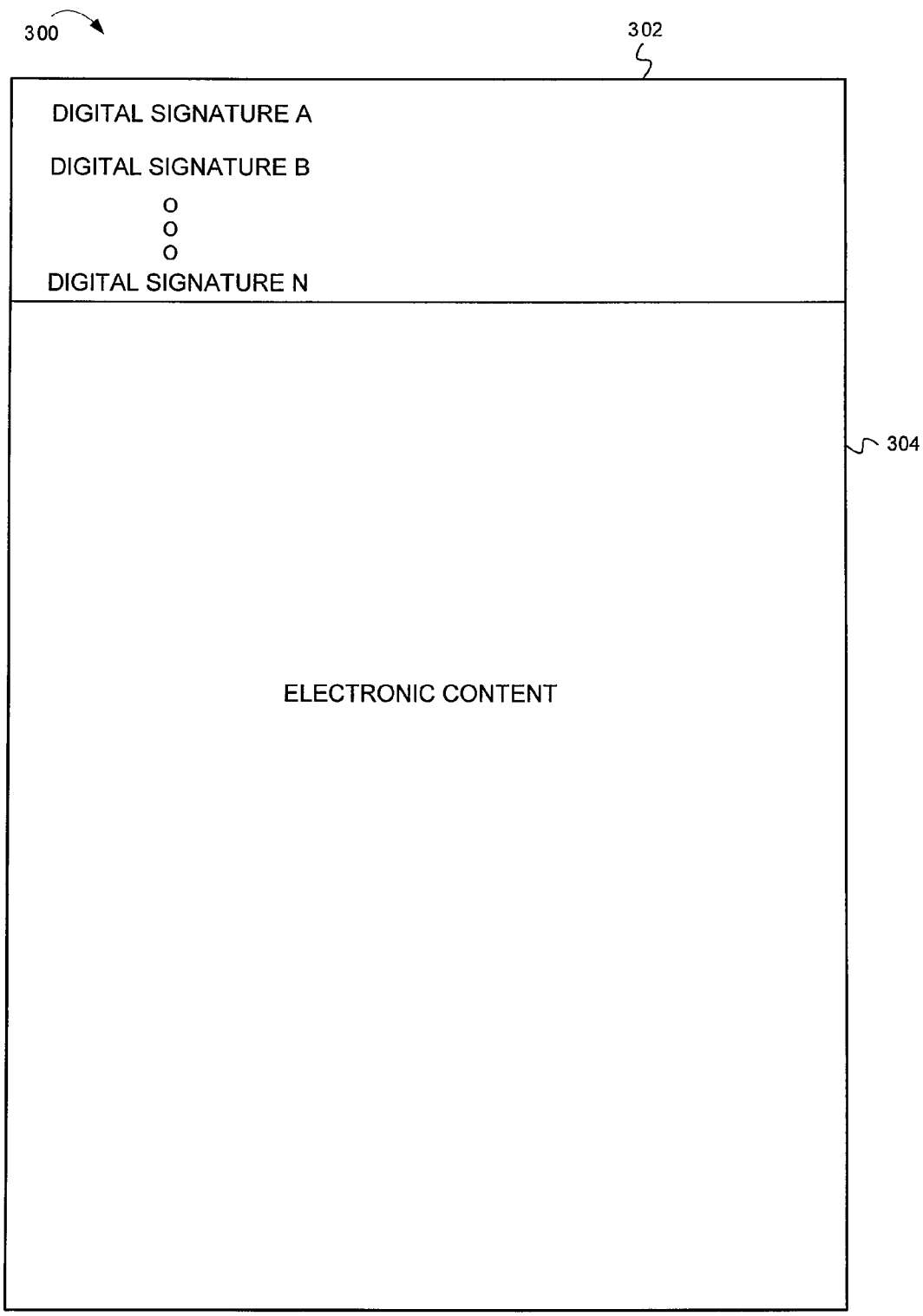
FIG. 3 is a diagrammatic representation of electronic content, according to some example embodiments.

At block 202, the archive module 110 receives electronic content (having a number of digital signatures) to be archived. The electronic content may have one to N number of digital signatures. In some example embodiments, a digital signature may be used to authenticate a user that made revisions to the electronic content. The digital signature may be associated with one to N number of revisions of the electronic content. FIG. 3 is a diagrammatic representation of electronic content, according to some example embodiments. The electronic content 300 includes a number of digital signatures 302 and the data 304 that is considered the electronic content. For example, the data 304 may be an electronic document, spreadsheet, PDF document, etc. Returning to FIG. 2, the method 200 continues at block 204.

At block 204, the archive module 110 determines the validity status of each of the digital signatures in the electronic content. In some example embodiments, the validity status may be valid, invalid or unknown. In some example embodiments, the archive module 110 determines the validity status based on data received from the certificate authority server 102 and the timestamp server 104 (which is further described below). For example, the certificate authority server 102 may provide data that indicates whether the digital certificate used to generate the digital signature is valid. The timestamp server 104 may provide verification that the timestamp (associated with the timing of the signing of the electronic content using the digital signature) is within a time period when the digital certificate was valid. Accordingly, the archive module 110 may use such data to determine the validity status of the digital signature. For example, if the digital certificate and timestamps for a digital signature are valid, the digital signature is considered valid. Alternatively or in addition, in some example embodiments, the archive module 110 determines the validity status based on a determination of whether the revision of the electronic content that corresponds to the digital signature has not been changed, modified, tampered, etc. In particular, the archive module 110 may validate the digital signature for this revision. The generation of the digital signature may comprise generation of a hash that is encrypted with a private key of the associated digital certificate. Accordingly, as part of the validation, the archive module 110 may decrypt the encrypted hash using the public key of the digital certificate. The archive module 110 may then recompute the hash. If the recomputed hash equals the decrypted hash, the revision may be considered validated (the electronic content has not been tampered). In some example embodiments, the validity status may be unknown because lack of network connectivity, data unavailable or corrupted, etc. The method 200 continues at block 206.

At block 206, the archive module 110 stores data related to the validity for each of the digital signatures (including the validity status) into metadata of the electronic content. In addition to the validity status of a digital signature, the archive module 110 also stores other validity data regarding the digital signatures into the metadata of the electronic content. The description of FIGS. 3-4 (which is set forth below) provide a more detailed discussion of the different types of validity data stored in the metadata of the electronic content. The method 200 continues at block 208.

At block 208, the archive module 110 converts each of the digital signatures into a stamp annotation that maintains an appearance of the digital signature. The stamp annotation may be different images that are representative of the digital signature. For example, the stamp annotation of a user may be an image of the user's handwritten signature. The stamp annotation may be stored with the associated digital signature (as further described below). In some example embodiments, the archive module 110 may overlay the validity status of the digital signature onto the stamp annotation. For example, one of the labels—VALID, INVALID or UNKNOWN—may be overlaid onto the stamp annotation. In some example embodiments, the stamp annotations may be stored in the metadata of the electronic content. The method 200 continues at block 210.

At block 210, the archive module 110 archives the electronic content (which includes the metadata that includes the validity data for the digital signatures). As described above as part of archiving, the archive module 110 may add and remove data to and from the electronic content so that the electronic content is accessible after the content is unarchived. For example, this embedded data may include raster images, vector graphics, fonts, color information, etc. In some example embodiments, references to external sources are also removed prior to archiving the electronic content. For example, references to hyperlinks are removed. The method 200 continues at block 212.

At block 212, the archive module 110 generates an attestation signature across the archived electronic content that includes the metadata (after the validity data for the digital signatures is stored in the metadata). The attestation signature may be derived from any type hash operation. For example, the hash operations may include Message Digest (MD)2, MD4, MD5, Secure Hash Algorithm (SHA), etc. Accordingly, the attestation signature secures the validity data for the digital signatures to the archived electronic content. In some example embodiments, the digital certificate used to create the attestation signature should have a "long" validity period. For example, the digital certificate may be valid for at least 1 year, 5 years, 10 years, 15 years, 20 years, 25 years, 30 years, 50 years, etc. In some example embodiments, the attestation signature is generated in accordance with Request for Comment (RFC) 3126, "Electronic Signature Formats for Long Term Electronic Signatures", Pinkas et al., September 2001, and any versions thereof, which is hereby incorporated by reference. The method 200 continues at block 214.

At block 214, the archive module 110 stores the archived electronic content and the attestation signature into a same or different machine-readable medium (e.g., machine-readable medium 112). Accordingly, as described in more detail below, in some example embodiments, the attestation signature may serve as part of the validation of the digital signatures in the archived electronic content after being unarchived. Thus, the digital signatures in the electronic content may be validated prior to archiving of the electronic content. The method 200 is complete.

In some example embodiments, the method 200 does not generate and store an attestation signature. For example, if the electronic content is stored on a secure, trusted server, the attestation signature is not generated and stored. In particular, the electronic content along with the archived representation of the digital signatures may be stored in the trusted, secure server, independent of an attestation signature.

Figure 4:
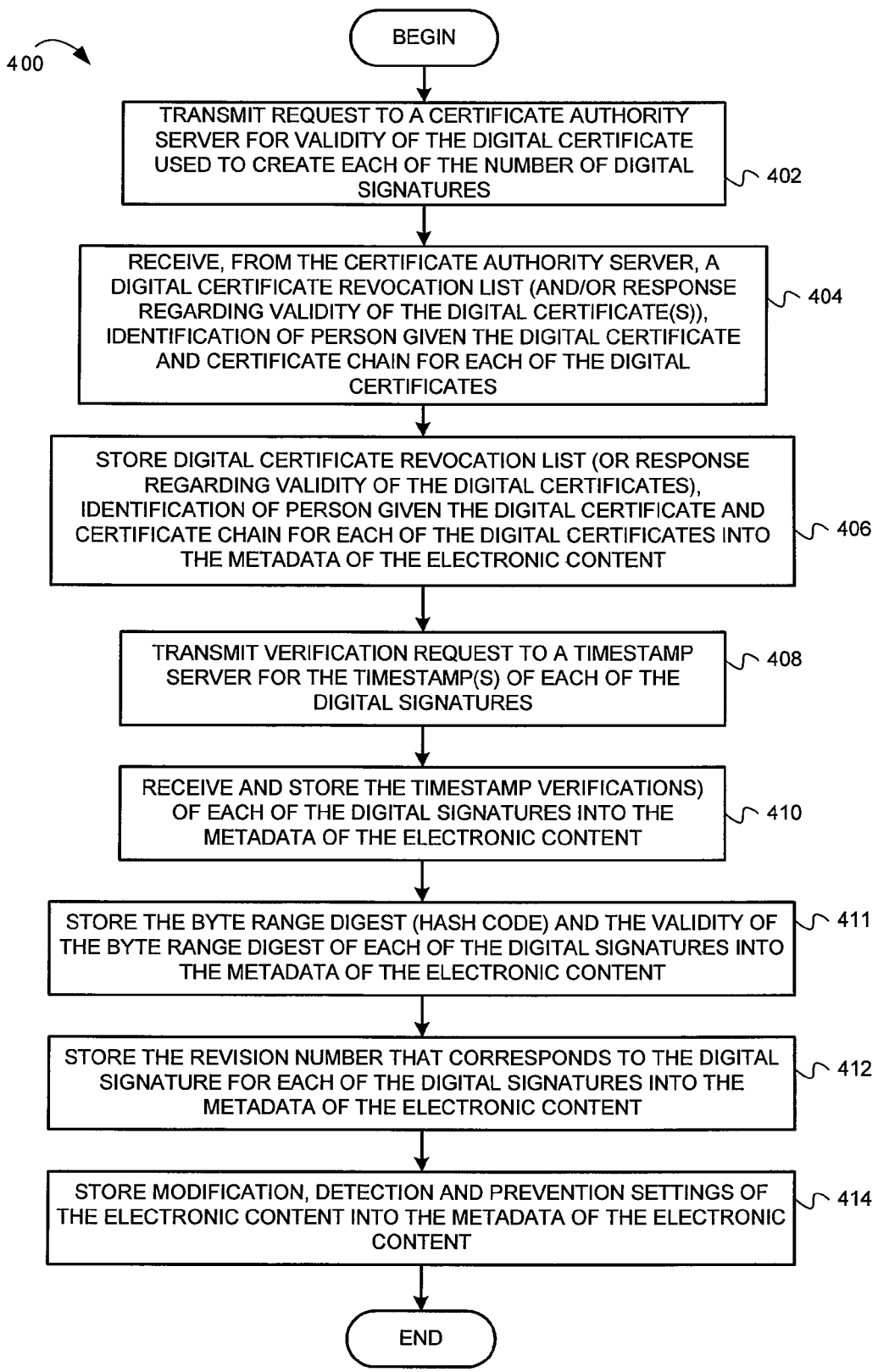
FIG. 4 is a diagram of a method for storing, within electronic content, data related to validity of the digital signatures in such content, according to some example embodiments.
Figure 5:
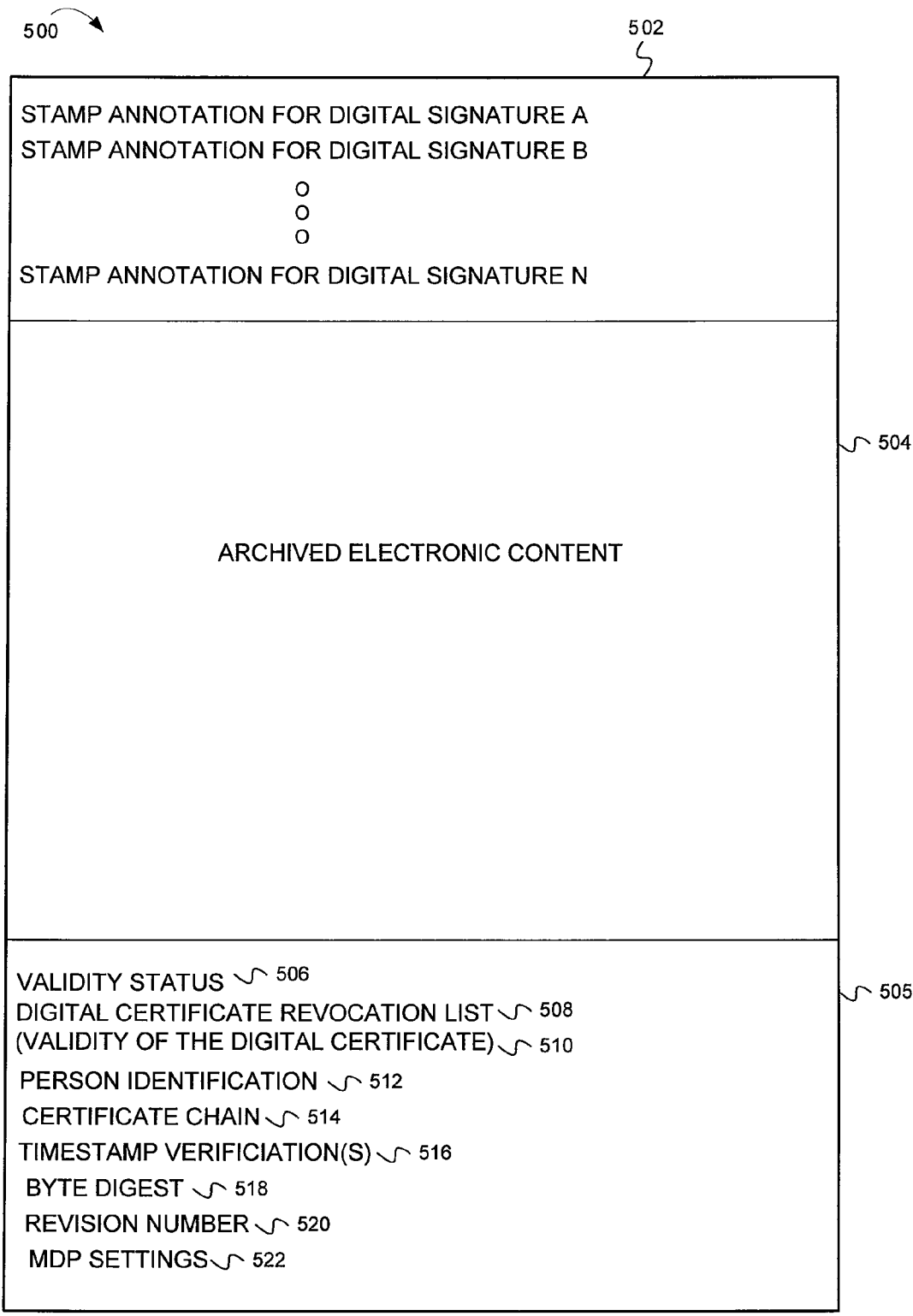
FIG. 5 is an example of electronic content having digital signatures and validity data regarding the digital signatures, according to some example embodiments.

Operations for the storage of different types of validity data for digital signatures in electronic content are now described. The operations are described relative to FIG. 4 and FIG. 5. In particular, FIG. 4 and FIG. 5 are described together. FIG. 4 is a diagram of a method for storing, within electronic content, data related to validity of the digital signatures in such content, according to some example embodiments. FIG. 5 is an example of electronic content having digital signatures and validity data regarding the digital signatures, according to some example embodiments. Similar to the electronic content 300 of FIG. 3, an electronic content 500 includes a number of stamp annotations of digital signatures 502 and the data 504 that is considered the electronic content. The electronic content 500 also includes metadata 505 that includes different types of validity data regarding the digital signatures (as further described below). For sake of clarity, the metadata 500 in FIG. 5 only illustrates validity data for one digital signature. However, such validity data may be included in the metadata 500 for each of the digital signatures. In some example embodiments, the method 400 is performed by the archive module 110. The method 400 commences at block 402.

At block 402, the archive module 110 transmits a request to a certificate authority server for validity of the digital certificates used to create each of the number of digital signatures. For example, with reference to FIG. 1, the archive module 110 may transmit the request to the certificate authority server 102. In some example embodiments, the electronic content may comprise a number of digital signatures that are derived from different digital certificates. These digital certificates may be issued from a same or different certificate authority. Accordingly, the archive module 110 may transmit requests to one to any number of different certificate authority servers. The method 400 continues at block 404.

At block 404, for each of the digital signatures, the archive module 110 receives, from the certificate authority server, a digital certificate revocation list (and/or a response regarding the validity of the digital certificate), identification of the persons given the digital certificate and a certificate chain. Thus, in some example embodiments, the archive module 110 may receive a list of all digital certificates that have been revoked from this certificate authority. Alternatively or in addition, the certificate authority server may return a validity status of the particular digital certificate. The validity status may be valid, invalid, revoked, unknown, etc. Therefore, the archive module 110 may store either or both the revocation list or the validity status of the particular digital certificate.

The archive module 110 may also receive an identification of the person associated with the digital certificate. In other words, the certificate authority server may provide an identification of the person to whom the certificate authority assigned the digital certificate. The identification may include one or more of a name, organization, email address, business address, home address, telephone number(s), etc. of the person. The archive module 110 may also receive a certificate chain of the digital certificates. As is known, a digital certificate may be verified through the use of another digital certificate. Accordingly, a certificate chain is created that generally ends with a root certificate. The method continues at block 406.

At block 406, for each of the digital signatures, the archive module 110 stores the digital certificate revocation list (and/or the response regarding the validity of the digital certificate), identification of the persons given the digital certificate and the certificate chain into the metadata of the electronic content. With reference to FIG. 5, the metadata 505 includes the validity status of the digital signature 506—see description of block 204 of FIG. 2. The metadata 500 also includes a digital certificate revocation list 508 (and/or validity of the particular digital certificate 510 that was used to create the digital signature). The archive module 110 may also store, in the metadata 505, an identification 512 of the person associated with the digital certificate and a certificate chain 514 for a digital signature. The method continues at block 408.

At block 408, the archive module 110 may transmit a verification request to a timestamp server for the timestamp (s) of each of the digital signatures. For example, with reference to FIG. 1, the archive module 110 may transmit the verification request to the timestamp server 104. In some example embodiments, the electronic content may comprise a number of digital signatures that are derived from different digital certificates. These digital certificates and digital signatures may use a same or different timestamp server. Accordingly, the archive module 110 may transmit the verification requests to one to any number of different timestamp servers. In some example embodiments, the timestamp is a time value when the digital signature was used to sign the electronic content. For example, as part of a revision of the electronic content, a user may digital sign the revision. The timestamp of when the revision was digitally signed may then be stored in the timestamp server. The verification request may include the timestamp values. The method 400 continues at block 410.

At block 410, the archive module 110 receives and stores of the timestamp verification(s) of each of the digital signatures into the metadata of the electronic content. In particular, in some example embodiments, the timestamp server may return a timestamp verification for each of the received timestamps. The timestamp server may determine whether the timestamps were within a range of time periods when the digital signatures were valid. If the timestamps were within a valid range, the timestamp server may return a positive timestamp verification. Otherwise, the timestamp server may return a negative timestamp verification. With reference to FIG. 5, the archive module 110 may store the timestamp verification(s) 516 for a given digital signature into the metadata 505. The method 400 continues at block 411.

At block 411, the archive module 110 stores the byte range digest (hash code) and the validity of the byte range digest (hash code) of each of the digital signatures into the metadata of the electronic content. In some example embodiments, the archive module 110 recomputes the byte range digest for the digital signature. If the recomputed byte range digest equals the current byte range digest for the digital signature, such digest is considered valid. With reference to FIG. 5, the archive module 110 may store the byte digest 518 and its validity (not shown) for a given digital signature into the metadata 505. The method continues at block 412.

At block 412, the archive module 110 stores the revision number (identification) that corresponds to the digital signature for the digital signatures into the metadata of the electronic content. In some example embodiments, a user that has a digital signature may sign one to N number of revisions of the electronic content. With reference to FIG. 5, the archive module 110 stores the revision number (identification) 520 that corresponds to the digital signature used. The method 400 continues at block 414.

At block 414, the archive module 110 stores modification, detection and prevention (MDP) settings of the electronic content into the metadata of the electronic content. MDP settings may comprise definitions of what operations may be performed relative to the electronic content. For example, an MDP setting may limit the type of edits, print options, etc. With reference to FIG. 5, the archive module 110 stores the MDP settings 522 into the metadata 505. The method 400 is complete.

In some example embodiments, the stamp annotation and the associated validity data stored in the metadata 500 for a digital signature is considered an archived digital signature. Accordingly, as described the digital signature is replaced with an archived digital signature in the archived electronic content. Thus, electronic content may have a set of digital signatures. After the electronic content is converted to archived electronic content, the archived electronic content may have a corresponding set of archived digital signatures. A set is defined to be one to any number.

Figure 6:
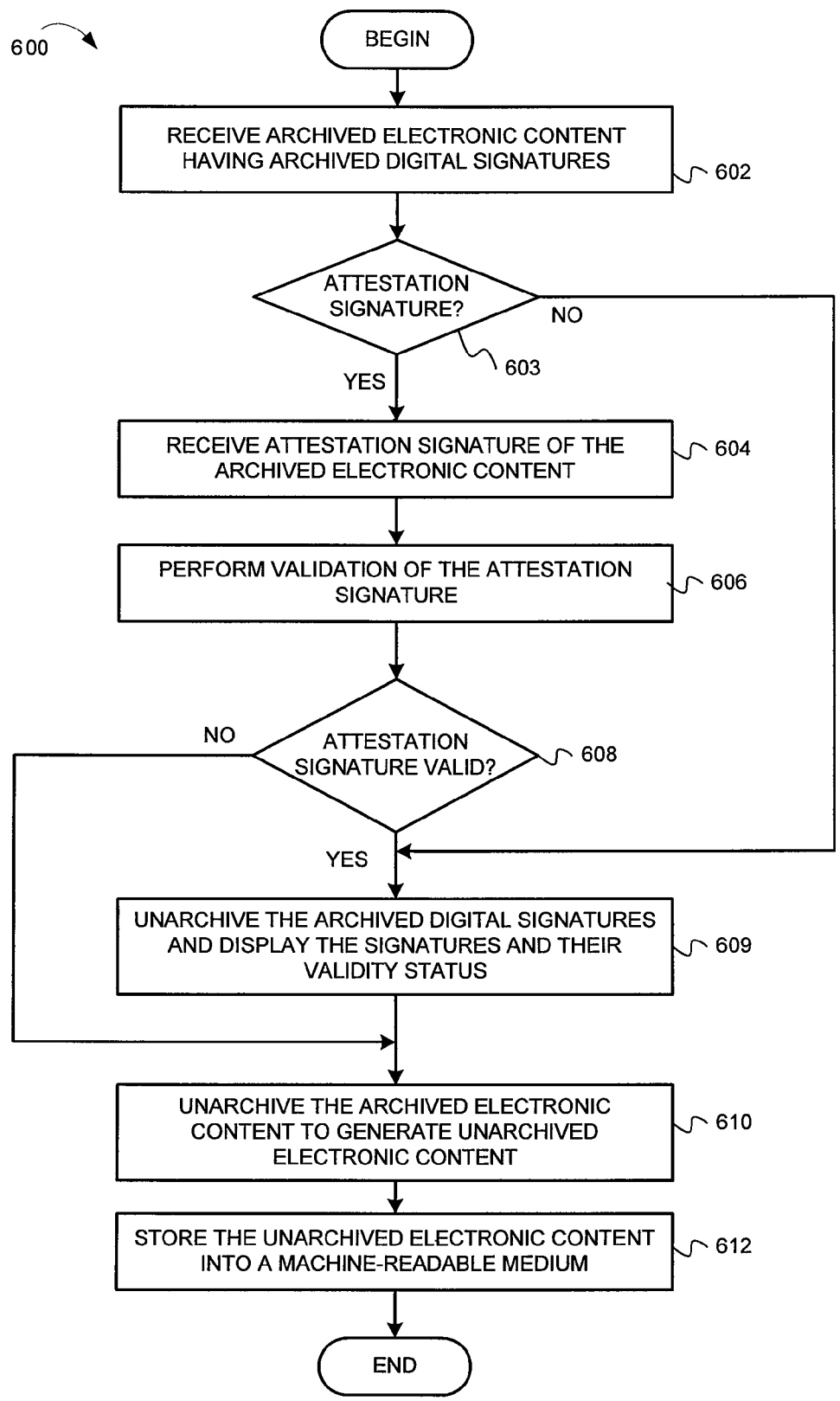
FIG. 6 is a diagram of a method for unarchiving electronic content having digital signatures, according to some example embodiments.

Operations for unarchiving archived electronic content, according to some example embodiments, are now described. In particular, FIG. 6 is a diagram of a method for unarchiving electronic content having digital signatures, according to some example embodiments. In some example embodiments, the method 600 is performed by the unarchive module 111. The method 600 commences at block 602.

At block 602, the unarchive module 111 receives archived electronic content having archived digital signatures. As described above, the archived electronic content may comprise one to N number of archived digital signatures. Also, the archived electronic content may comprise validity data for the digital signatures that was created and stored in the metadata prior to archiving the electronic content. The method 600 continues at block 603.

At block 603, the unarchive module 111 determines whether there is an associated attestation signature for the archived electronic content. As described above, in some example embodiments, the archived electronic content may not include the associated attestation signature. If there is not an associated attestation signature, the method 600 continues at block 610 (described below). Otherwise, the method 600 continues at block 604.

At block 604, the unarchive module 111 receives the attestation signature of the archived electronic content. As described above, the attestation signature and the associated archived electronic content may or may not be stored together. The method continues at block 606.

At block 606, the unarchive module 111 performs a validation of the attestation signature. In some example embodiments, the unarchive module 111 validates by performing a same hash operation with the cryptographic key used to initially created the attestation signature. If the value of the attestation signature equals the result of the hash operation performed for validation, the attestation signature is considered validated. Alternatively or in addition, the unarchive module 111 may validate the attestation signature based on the validity of the digital certificate used for the attestation signature. Such validation may be similar to the validation of the digital signatures within the electronic content (as described above at block 204 of FIG. 2. The method continues at block 608.

At block 608, the unarchive module 111 determines whether the attestation signature is valid. If the attestation signature is valid, the method 600 continues at block 609. Otherwise, the method 600 continues at block 610, which is described in more detail below.

At block 609, the unarchive module 111 unarchives the archived digital signatures and displays the signatures and their validity status. In some example embodiments, the unarchive module 111 may retrieve the validity data for the number of digital signatures from the metadata of the electronic content. The unarchive module 111 may also display some or all of this validity data in a signature panel on the interface for the application. This enables the user that unarchived the electronic content to review the validity data. The method 600 continues at block 610.

At block 610, the unarchive module 111 unarchives the archived electronic content to generate unarchived electronic content. The unarchive module 111 may use the embedded data in the archived electronic content to open the electronic content. For example, the unarchive module 111 may use embedded fonts, colors, graphics, etc. to open the electronic content. The method 600 continues at block 612.

At block 612, the unarchive module 111 stores the unarchived electronic content into a machine-readable medium. The machine-readable medium may be a volatile machine-readable medium (e.g., random access memory) or non-volatile machine readable medium (e.g., hard disk drive). For example, the unarchive module 111 may store the unarchived electronic content into a memory to enable the opening of the unarchived electronic content for displaying to enable reading, editing, etc. Alternatively or in addition, the unarchive module 111 may store the unarchived electronic content into a non-volatile machine readable medium (e.g., a magnetic disk storage medium). In some example embodiments, the validation of the attestation signature is denoted or considered as a validation of the number of digital signatures during the unarchiving operation. Also, in some example embodiments, the number of digital signatures are not revalidated during or after the unarchiving operation.

Figure 7:
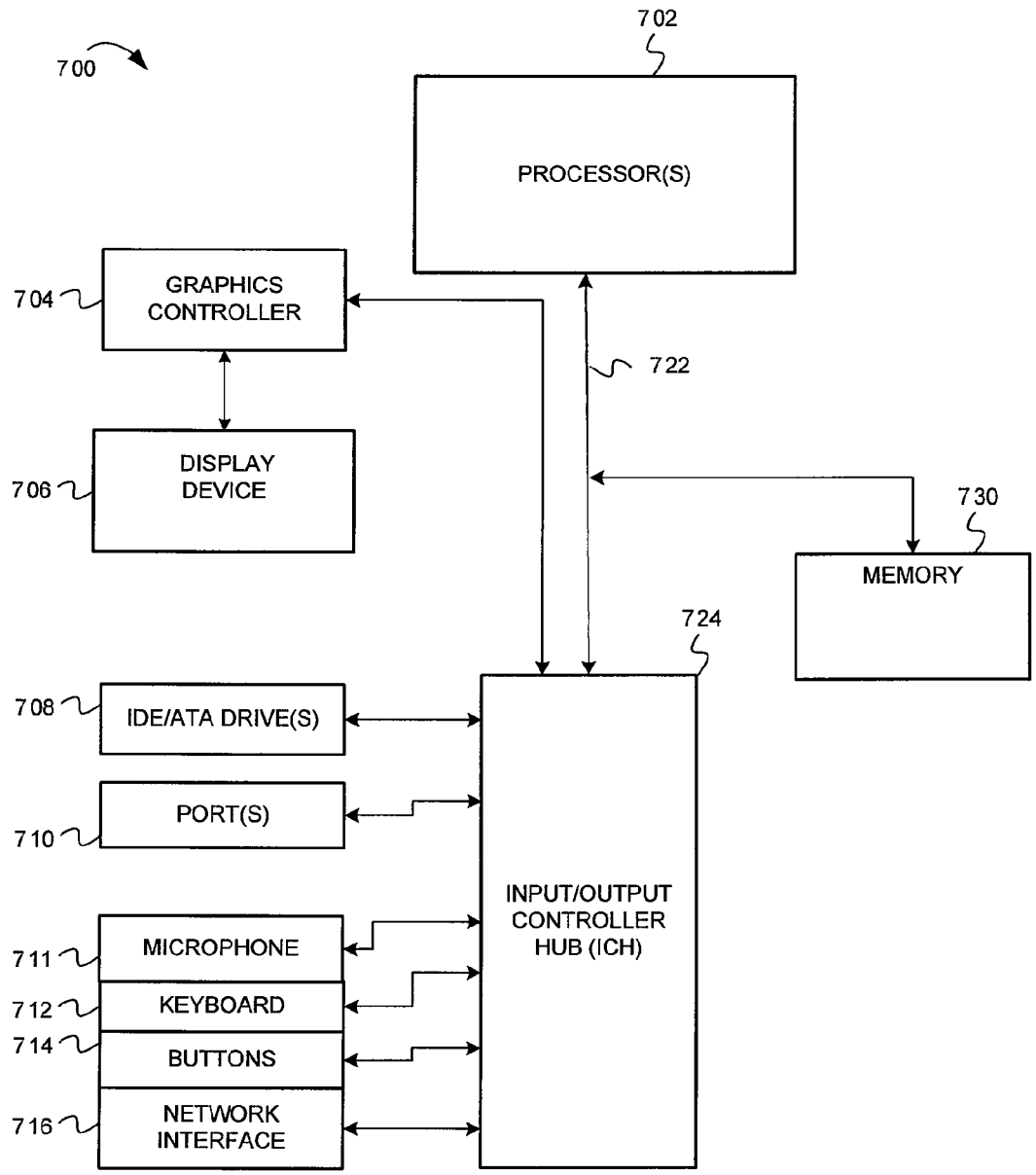
FIG. 7 illustrates a computer that may be used for archiving/unarchiving electronic content having digital signatures, according to some example embodiments.

A detailed block diagram of an example computer environment, according to some embodiments, is now described. In particular, FIG. 7 illustrates a computer that may be used for archiving/unarchiving electronic content having digital signatures, according to some example embodiments. A computer system 800 may be similar to or identical to one of the computer system 108, the certificate authority server 102, the time stamp server 104, etc.

As illustrated in FIG. 7, the computer system 700 comprises processor(s) 702. The computer system 700 also includes a memory unit 730, processor bus 722, and Input/Output controller hub (ICH) 724. The processor(s) 702, memory unit 730, and ICH 724 are coupled to the processor bus 722. The processor(s) 702 may comprise any suitable processor architecture. The computer system 700 may comprise one, two, three, or more processors, any of which may execute a set of instructions to implement the various method embodiments of the invention.

The memory unit 730 may store data and/or instructions, and may comprise any suitable memory, such as a dynamic random access memory (DRAM). The computer system 700 also includes IDE drive(s) 708 and/or other suitable storage devices. A graphics controller 704 controls the display of information on a display device 706, according to some embodiments of the invention.

The input/output controller hub (ICH) 724 provides an interface to I/O devices or peripheral components for the computer system 700. The ICH 724 may comprise any suitable interface controller to provide for any suitable communication link to the processor(s) 702, memory unit 730 and/or to any suitable device or component in communication with the ICH 724. For one embodiment of the invention, the ICH 724 provides suitable arbitration and buffering for each interface.

For some embodiments of the invention, the ICH 724 provides an interface to one or more suitable integrated drive electronics (IDE) drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, a mouse 714, a CD-ROM drive 718, one or more suitable devices through one or more FireWire® ports 716. For one embodiment of the invention, the ICH 724 also provides a network interface 720 though which the computer system 700 can communicate with other computers and/or devices.

In some embodiments, the computer system 700 includes a machine-readable medium that stores a set of instructions (e.g., software) embodying any one, or all, of the methodologies for described herein. Furthermore, software may reside, completely or at least partially, within memory unit 730 and/or within the processor(s) 702.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computerized method comprising:
   receiving electronic content to be archived, the electronic content including a digital signature;
   archiving the digital signature, the archiving of the digital signature includes determining a validity status of the digital signature prior to archiving the electronic content and storing the validity status of the digital signature into metadata within the electronic content being archived; and
   archiving the electronic content including the metadata after the validity status has been stored into the metadata within the electronic content.

2. The computerized method of claim 1, wherein the determining of the validity status of the digital signature comprises determining that a digital certificate, which includes a cryptographic key used to generate the digital signature, was valid at the time that the digital signature was generated.

3. The computerized method of claim 2, wherein the determining that the digital certificate was valid comprises:
   requesting validity information pertaining to the digital certificate from a server of a certificate authority that issued the digital certificate; and
   receiving at least one of a digital certificate revocation list, a valid-status indication, an invalid-status indication, a revoked-status indication, and an unknown-status indication pertaining to the digital certificate.

4. The computerized method of claim 3, further comprising storing the at least one of the digital certificate revocation list, the valid-status indication, the invalid-status indication, the revoked-status indication, and the unknown-status indication in the electronic content prior to generating an attestation signature across the electronic content.

5. The computerized method of claim 1, wherein the determining of the validity status of the digital signature comprises validating a timestamp of the digital signature from a timestamp server.

6. The computerized method of claim 1, further comprising generating an attestation signature across the electronic content including the stored validity status after the archiving of the electronic content.

7. The computerized method of claim 6, further comprising storing, in the electronic content prior to the generating of the attestation signature across the electronic content, at least one of an identification of an entity that created the digital signature that is included in the electronic content and a chain of a digital certificate that includes a cryptographic key used to generate the digital signature.

8. The computerized method of claim 6, wherein the electronic content comprises a number of digital signatures, wherein the computerized method further comprising storing, in the electronic content prior to generating the attestation signature across the electronic content, at least one of the number of revisions of the electronic content and which of the number of digital signatures corresponds to each of the number of revisions.

9. The computerized method of claim 6, further comprising storing, in the electronic content prior to generating the attestation signature across the electronic content, a modification, detection and prevention setting of the electronic content.

10. The computerized method of claim 6, further comprising unarchiving the archived electronic content, wherein the unarchiving includes validating the attestation signature, the validating of the attestation signature being independent of the determining of the validity of the digital signature in the electronic content.

11. The computerized method of claim 1, further comprising converting the digital signature into a stamp annotation that represents the digital signature, a combination of the stamp annotation and the validity status creating an archived digital signature that replaces the digital signature.

12. A non-transitory machine-readable medium including instructions, which when executed by a machine cause the machine to perform operations comprising:
    receiving electronic content to be archived, the electronic content including a digital signature that was generated using a cryptographic key of a digital certificate;
    archiving the digital signature, the archiving of the digital signature includes:
       determining a validity status of the digital signature prior to archiving the electronic content by requesting validity information pertaining to the digital certificate from a server of a certificate authority that issued the digital certificate and by receiving at least one of a digital-certificate revocation list, a valid-status indication, an invalid-status indication, a revoked-status indication, and an unknown-status indication pertaining to the digital certificate, and
       storing the validity status of the digital signature by storing the at least one of the digital-certificate revocation list, the valid-status indication, the invalid-status indication, the revoked-status indication, and the unknown-status indication into metadata within the electronic content being archived; and
    archiving the electronic content including the metadata after the validity status has been stored into the metadata within the electronic content.

13. The non-transitory machine-readable medium of claim 12, further comprising instructions, which when executed by the machine cause the machine to unarchive the electronic content and display the digital signature and validity status.

14. The non-transitory machine-readable medium of claim 12, wherein electronic content includes data related to the validity of the digital signature, the data comprising a modification, detection and prevention setting of the electronic content.

15. The non-transitory machine-readable medium of claim 12, wherein the electronic content comprises a number of digital signatures and data related to the validity of the number of digital signature, the data related to the validity of the number of digital signatures comprising at least one of the number of revisions of the electronic content and which of the number of digital signatures corresponds to each of the number of revisions.

16. An apparatus comprising:
a non-volatile machine-readable medium; and
an archive module configured to receive electronic content to be archived, the electronic content including a digital signature and data relating to the digital signature, the archive module further configured to archive the digital signature, the archiving of the digital signature including:
determining a validity status of the digital signature prior to archiving the electronic content by receiving validity-status information from a certificate-authority server, a timestamp server, or a combination thereof;
converting the digital signature into a stamp annotation that represents the digital signature;
creating an archived digital signature by combining the stamp annotation with the validity-status information; and
storing the archived digital signature within the electronic content being archived in the non-volatile machine-readable medium.

17. The apparatus of claim 16, wherein the archive module is to request, from the certificate authority server, a validity of a digital certificate used to generate the digital signature, the archive module to receive, in response to the request, the validity-status information including at least one of a digital certificate revocation list and a validity of the digital certificate.

18. The apparatus of claim 17, wherein the at least one of the digital certificate revocation list and the validity of the digital certificate are stored in the electronic content.

19. The apparatus of claim 16, wherein the validity-status information further includes at least one of an identification of an entity that created the digital signature that is in the electronic content, a hash code of the revision to the electronic content, and a chain of a digital certificate that includes a cryptographic key used to generate the digital signature.

* * * * *